Figure 2:
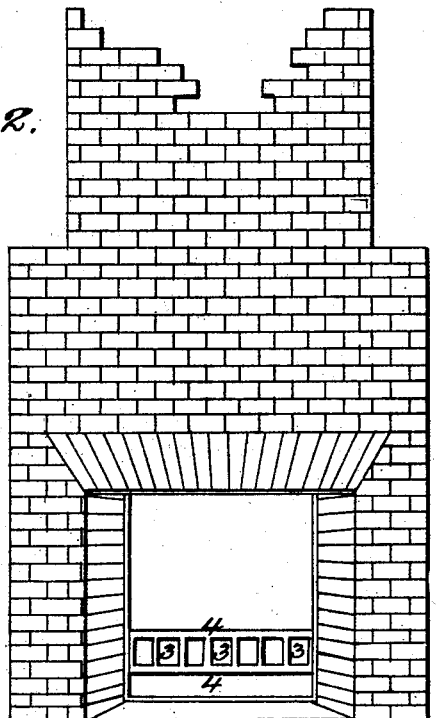

J. HAGERTY.
Fire Place.

No. 655.

6 Sheets—Sheet 1.

Patented March 24, 1838.

Witnesses:

Inventor:
John Hagerty.

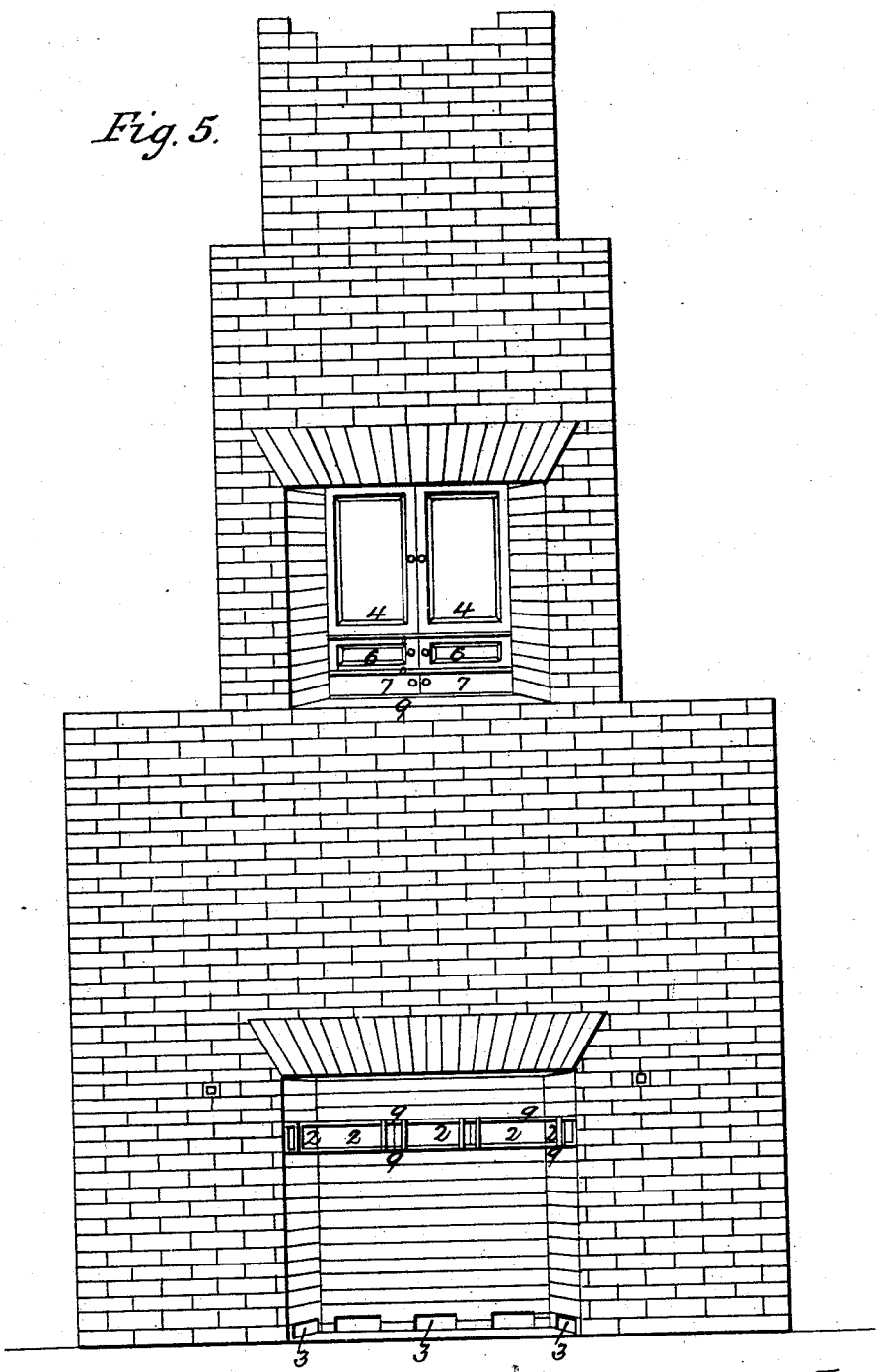

J. HAGERTY.
Fire Place.

No. 655.

6 Sheets—Sheet 3.

Patented March 24, 1838.

Witnesses:

Inventor:
John Hagerty

J. HAGERTY.
Fire Place.

No. 655.

6 Sheets—Sheet 4.

Patented March 24, 1838.

Witnesses:

Inventor:
John Hagerty.

6 Sheets—Sheet 5.
J. HAGERTY.
Fire Place.
No. 655.
Patented March 24, 1838.
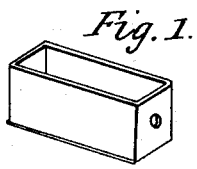
Fig. 1.
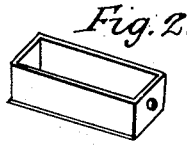
Fig. 2.
Fig. 3.
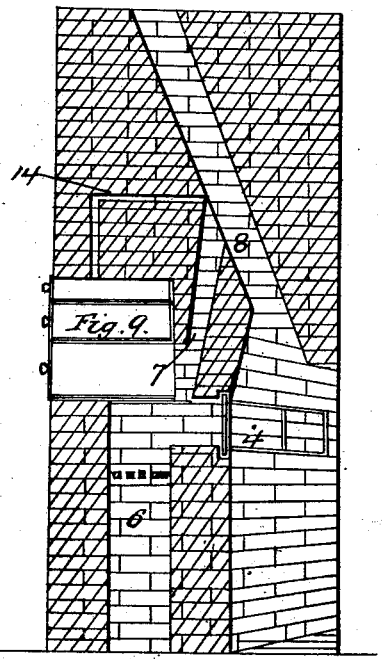
Fig. 11.
Side Section.
Fig. 12.
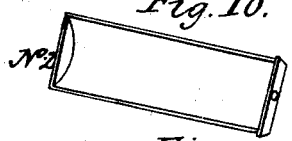
Fig. 10. Nº 2
Fig. 10 Nº 1
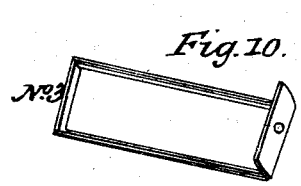
Fig. 10. Nº 3
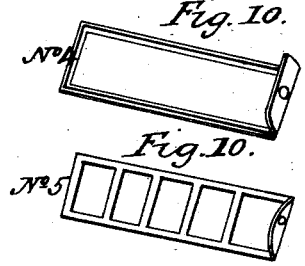
Fig. 10. Nº 4
Fig. 10. Nº 5
Witnesses:
Inventor:
John Hagerty.

J. HAGERTY.
Fire Place.
6 Sheets—Sheet 6.
No. 655.
Patented March 24, 1838.
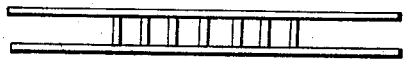
Fig. 1.
Fig. 2.
Fig. 5.
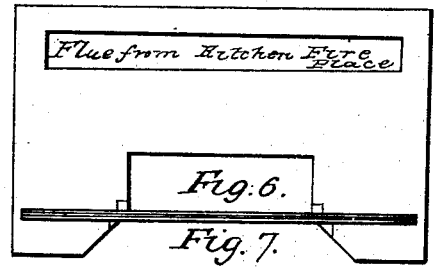
Fig. 3
Flue from Kitchen Fire Place
Fig. 6.
Fig. 7.
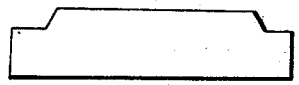
Fig. 4.
Witnesses:
Inventor:
John Hagerty.

UNITED STATES PATENT OFFICE.

JOHN HAGERTY, OF MONROE, MICHIGAN.

COMBINED PARLOR AND KITCHEN FIREPLACE.

Specification of Letters Patent No. 655, dated March 24, 1838.

*To all whom it may concern:*

Be it known that I, JOHN HAGERTY, of the city and county of Monroe, in the State of Michigan, have invented, constructed, made, and applied to use a new and useful Improvement in Combined Parlor and Kitchen Fireplaces, specified in the words and figures following.

This fire place, with its chimney is built mostly of bricks in nearly the common external form, but the internal structure, and the form of the jamb are essential improvements in the mode of building fire places and chimneys; when constructed for cooking purposes, the chimney is built in such a form, and the cooking utensils are placed in the chimney in such a manner, that the cooking room is not heated and the quantity of fuel ordinarily used for cooking is essentially diminished, the dishes used in cooking are also perfectly secure from the admission of any foreign substance during the process of cooking or heating—; the parlor fire place in this chimney unites superior elegance and convenience, with a capacity of imparting from a cheerful fire a great quantity of heat to the room with a small quantity of fuel, or if desired of admitting the sliding dampers to be closed so as to diminish the temperature of the room at pleasure. The chimney is built with a fire place and flues and air openings &c. On one side and on the opposite side are the cooking utensils, boilers, bakers, &c., so located that the cooking is done in a different room from that in which the fire place is located and the fuel communicated to the fire chambers under the cooking apparatus; the front view of the kitchen fire place, as seen from the room not used for cooking; also the front view of the parlor fire-place with the dampers closed may be seen in plate No. 1; also in plate No. 2 with the dampers open excepting the damper closing the center feeder. In kitchen fire-place designated by Figure 1, which is closed, plate No. 3 represents the front view of the rear or cooking part of the chimney as seen from the room used for cooking.

Figure 1:
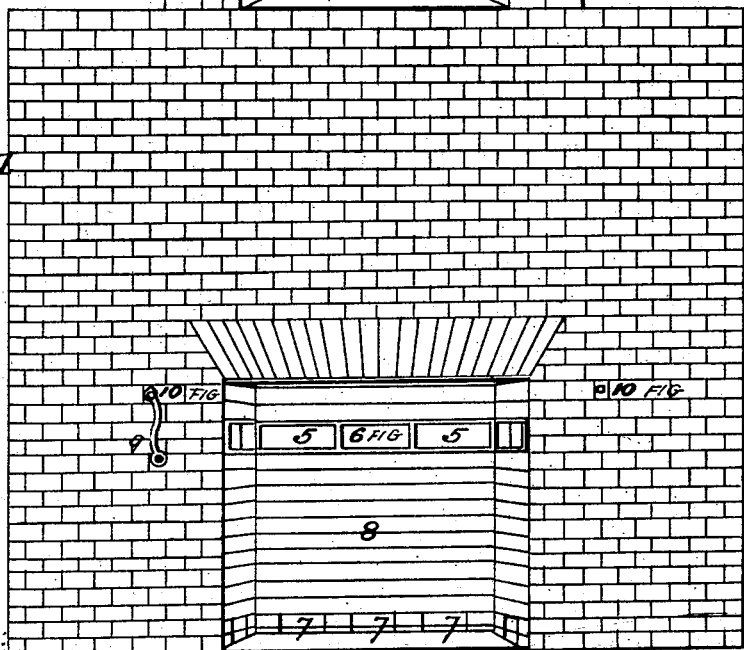
Figure 1:
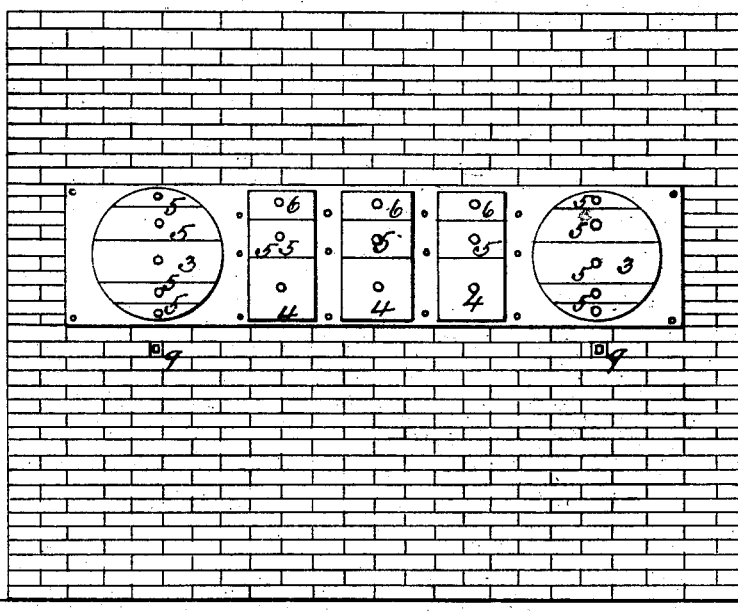
Figure 2:
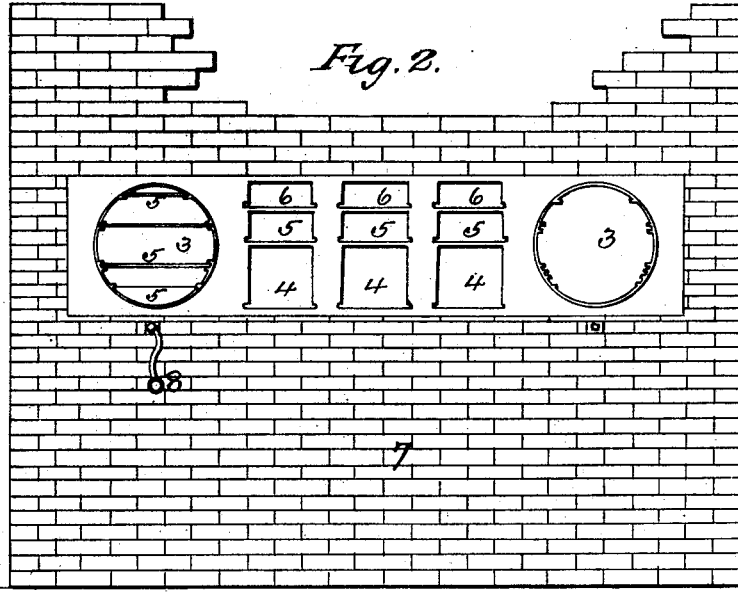
Figure 1:
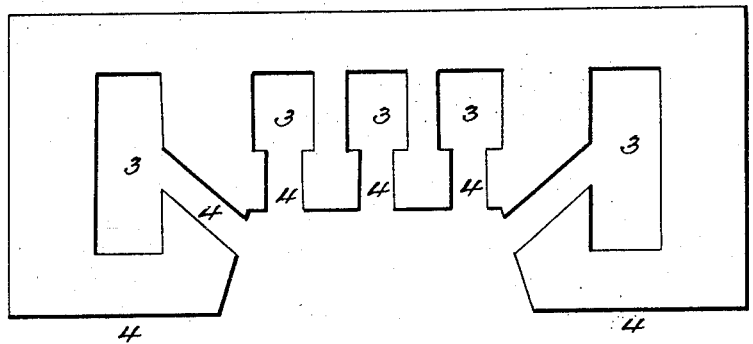
Figure 2:
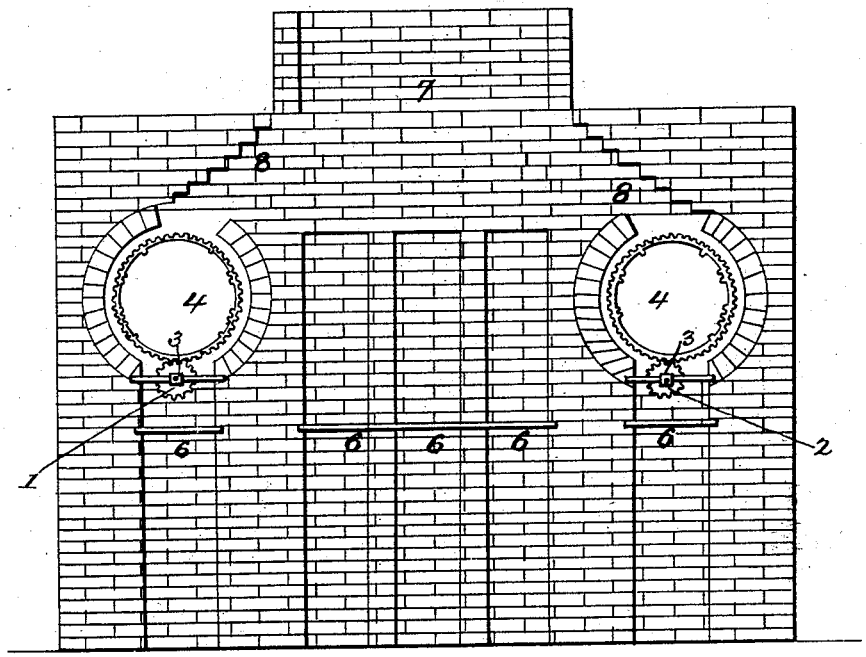

Fig. 1 is a front view of the same side with the cooking utensils all in their places as used in cooking; Fig. 2 represents a view of the same with the bakers, boilers, and cooking utensils withdrawn.

The boilers, bakers, &c., being about 2½ feet from the hearth or kitchen floor plate No. 4, Fig. 1 represents a ground plan of the kitchen fire-place and internal structure of the chimney at the base the open spaces Fig. 3 on the spaces between the brick walls below the fire grate the spaces designated by Fig. 4 are air openings leading from fire place designated by Fig. 5. Two of these air openings may be in the front of jambs from fire place or from the room as designated by red lines as in the plate.

Fig. 2 shows the form of the internal structure of the chimney with the external wall fronting the cooking room taken off.

Plate No. 5 represents the chimney or an internal section as divided from front to rear exposing one tier of boilers and the direction of the flues; the flue leading from fire under the boilers, &c., is designated by Fig. 7 from fire place by Fig. 8.

Plate No. 6 Fig. 3 represents the plan of a parlor or sitting-room fire place in the upper story but may as well be on the ground story with a slight variation. This designates a view of the ground plan of parlor fire-place which is closed by sliding dampers that may slide with the jambs as far forward as the bar represented in Fig. 7 as seen in plate Nos. 1 and 2.

The chimney with a fire-place and fire-chamber and cooking apparatus on the opposite side of chimney is built in the form designated by plates No. 4, Fig. 1, of brick walls to the height of from 4 to 6 inches when the walls are carried over the air openings designated by Fig. 4 in closing air flues or openings for giving a draft to the fire, in which form the chimney is built upward about 2½ feet leaving the spaces designated by Fig. 3 for fire chambers or furnaces which have iron grates across them about one and one half or two feet from the hearth. These grates are designated in plate No. 4 Fig. 2 by Fig. 6, where the internal form of these are seen at full length. At this distance from the hearth and about 8 inches above the said grates into the front or fire place side of the chimney spaces or openings are left communicating with the said fire chamber above the said grates about 8 inches in width for the purpose of putting fuel on the said grates which spaces have two iron bars or plates inserted one at the lower part of the openings or spaces thus left the other at the opposite part of the same with grooves in them into which sliding dampers of cast iron are fixed of the same length each as the spaces or fire chambers are in width so that the openings or spaces thus leading into the fire chambers above the grates may be opened or closed at pleasure, which are constructed for the purpose of putting in coal and other fuel into the fire chambers for heating the cooking apparatus above the said grates, a front view of which may be seen in plate No. 2 Figs. 5 and 6, also in plate No. 1, Fig. 2. The iron bars or plates designated in plate No. 1 by Fig. 9, in other respects the chimney, is constructed to the upper side of the said space in the form presented in the ground plan presenting the partitions between the fire chambers.

On a plane perpendicular with the rear side of the chimney and resting on a plane horizontal with the upper surface of the said upper bar is a cast-iron plate extending nearly the whole width of the rear part of the chimney being about two feet in width with apertures or spaces for the admission of boilers and cylindrical rotary bakers. The boilers to slide (on rollers or otherwise) into the chimney through the said plate on groove in iron bars which are built into the partition walls between the said fire chambers at distances to correspond with the required size of the boilers the said bar having a space turned up at each end forming a knee that at one end intended to match firmly into the wall, that on the other to turn up at the surface of the wall for the purpose of having the said iron plate fastened to the same by a screw. The form of which bar may be seen in plate No. 5 Fig. 12, Fig. 13, being the outer end to which the said plate is fastened. The boilers are located over the fire chamber in rear of the said fire place entering through the said plate in the manner of drawers to be slid on the groove of the said bars or on rollers at pleasure; over the two boilers that are inserted over each chamber there is a steamer, from the top of this steamer there is continued upward a steam flue that communicates with the main flue after making an angle in the wall of the chimney so as to prevent the soot from falling into the same. There are two cylindrical rotary bakers to be used either for baking or frying located in rear of each end of the said plate directly over the fire chamber in rear of the jambs furnished with slides and dampers, &c. The said boilers are shorter than the width of the fire chambers so as to allow a space for the passage of the smoke in rear of them next the back of the chimney fire-place a front view of which may be seen in plate No. 6, Fig. 1.

Figs. 4 and 5 and 6 represent the ends of the boilers slid into the chimney like drivers over the fire chamber with brass knobs on them; Fig. 3 designates the end view of the rotary bakers with slides in them which may be withdrawn to suit the convenience of the cook having brass knobs on them for this purpose any number of the slides in the baker may be withdrawn and dampers used to close the mouth of the same if much room be required in baking.

Fig. 7 represents the ends of gudgeons to which a crank may be fixed to revolve the cog-wheel located below the said cylindrical baker to revolve the same when desired.

Fig. 2 represents the space in the said cast iron plate and chimney for the said boilers and cylindrical bakers; Fig. 8 represents the crank that is to be used in revolving the said cylinder, Fig. 7 the brick wall below the said plate on the cooking or rear side of the chimney; above the plate the chimney is continued a small distance, having a small flue above the boilers as in Fig. 14; when the flue from the fireplace and the fire chambers are united as seen in plate No. 5 Figs. 7 and 8, above which the walls of the chimney are continued in the usual form (the fire-place flue having been built at the top in the common mode) at a convenient distance to unite the chambers under the said cylinders, when the said flues are united with the common flue, the flue leading from the said chambers being designated in plate No. 4 Fig. 2 by Fig. 8 and the common flue by Fig. 7.

A parlor or sitting room fire place is constructed mainly of bricks a ground view of which may be seen in plate No. 6 Fig. 3 with a flue in rear of the same as built in an upper story Fig. 7. An iron bar laid level with the upper surface of the hearth with a groove in the upper side the space designated by Fig. 6 represents the form of the fire place which is built up in this form with two perpendicular iron bars at each angle of the jambs laid into the wall the form of which is designated in said plate by Fig. 8. The said bars are placed a small distance apart to admit sliding dampers between them into the wall of the jamb the chimney is thus (the back being at right angle with the jamb until the bevel commences at the said upright iron bars) built up about 6 inches where a horizontal bar of iron similar to the first mentioned with a groove on both sides is laid parallel with the same, both of said bars extending into the jamb half the distance of the width of the fire place to admit sliding dampers which are to occupy the space between these bars and a space is left in the chimney walls of the jamb for the purpose; on a level with the last mentioned horizontal cast iron bar a horizontal cast iron grate is laid over the whole area of fire place of the form seen in Fig. 2, whence the chimney is carried up about four inches to another horizontal bar with a groove on both sides parallel with the last mentioned connected with the same by small iron bars thus forming a perpendicular upright grate four inches high and the space thus left between the said last mentioned bars may be closed with sliding dampers as those below, the chimney is from thence carried up to the mantletry leaving in the jamb spaces between the said perpendicular bars for sliding in dampers the mantletry is a bar of iron carried round the two ends of the chimney so as to strengthen the wall where the space is left for the damper to slide with it; from this mantletry on the front wall above on the inside an iron plate is fixed inclined to conform with the inside of the wall of the chimney in front of the flue this plate is sufficiently wide to extend to the rear of the front perpendicular iron bar directly back of this an iron bar is laid into the wall parallel with the back side of the same leaving a space or gutter corresponding with that between the upright perpendicular bars two sliding dampers are intended to be supported at the top by entering the space thus left between the said last mentioned plate and bar and at the bottom resting on the upper groove of the groove in the bar above the upright grate these sliding dampers may be slid into the spaces left in the jambs between the two upright iron bars or withdrawn so as to allow the fire light into the room, above this the flue and chimney is built in the common form.

The form of the boiler and the steamer and baking pans and a sliding grate may be seen in plate No. 5, Fig. 1, is a large sliding boiler to be the lower one as seen in plate No. 3 Fig. 2, the boilers to be inserted or withdrawn at pleasure above the first in manner represented in plate No. 3 Fig. 5 Fig. 3 represents a steamer to be placed above the other two first described boilers as in plate No. 3, Fig. 6.

Fig. 10, represents the slides to be in the cylindrical bakers as seen in plate No. 3 Fig. 3. One of them being a sliding grate to suspend any article on if desired in the baking when the slides are all in the cylinders the same are completely closed but if the insertion of all of them would make the shelves too thick for the convenience of the cook any portion of them may be withdrawn and the mouth of baker closed with dampers; the cylinders may be made of iron of copper but cast iron is preferable the slides are made of cast iron.

The improvement claimed by the said John Hagerty as his own invention consists—

1. The location of the flues (used in cooking) in the interior of the chimney directly under the boiler or baker required to be heated, in the manner herein represented; the advantages of which are that no other part of the chimney is heated but that under the particular vessel required in cooking and unless desired none or very little heat is imparted to the room, that very little fuel is used in cooking.

2. The location of the cooking utensils which at a convenient height slide on rollers or in grooves into the chimney and occupy very little space in the room and the cylinders used for baking and frying have drawers in them so that any form may be given to the interior of the baking vessel at pleasure by withdrawing any portion of the slides or baking pans; and the said baker may be opened at the mouth and any one of the pans used for frying and for the purpose of heating the upper surface of the pan used for frying the oven may be revolved at pleasure also for the purpose of imparting a uniform heat to the baker; which revolution of the oven I do not claim as of my invention, further than as combined in my apparatus.

3. The manner of constructing the air opening into the back of the chimney for giving a draft, and adding fuel to the fires used for heating the cooking apparatus.

In testimony that the above is a true specification of my said improvement as above described I have hereto set my hand the twenty-ninth day of August in the year of our Lord one thousand eight hundred and thirty seven.

JOHN HAGERTY.

Witnesses:
Franklin Johnson,
Albow Bennett.